US005518979A

United States Patent [19]
Bonse et al.

[11] Patent Number: 5,518,979
[45] Date of Patent: May 21, 1996

[54] ABRASION-RESISTANT CATALYST CARRIER FORMED OF TRANSITION ALUMINAS

[75] Inventors: Dirk Bonse, Lehrte; Karl-Heinz Bretz; Helmut Derleth, both of Nienburg; Michael Sell, Peine, all of Germany

[73] Assignee: Solvay Umweltchemie GmbH, Hanover, Germany

[21] Appl. No.: 302,751

[22] PCT Filed: Mar. 8, 1993

[86] PCT No.: PCT/EP93/00525

§ 371 Date: Sep. 13, 1994

§ 102(e) Date: Sep. 13, 1994

[87] PCT Pub. No.: WO93/17786

PCT Pub. Date: Sep. 16, 1993

[30] Foreign Application Priority Data

Mar. 13, 1992 [DE] Germany .................... 42 07 961.6

[51] Int. Cl.⁶ ............................. B01J 21/02; B01J 21/04
[52] U.S. Cl. ............................. 502/355; 502/439
[58] Field of Search ................... 502/8, 9, 334, 502/439, 355; 423/628; 422/140

[56] References Cited

U.S. PATENT DOCUMENTS

| | | | |
|---|---|---|---|
| 4,102,978 | 7/1978 | Kiovsky | 423/626 |
| 4,637,908 | 1/1987 | Weingärtner | 264/143 |
| 4,704,378 | 11/1987 | Fleming et al. | 502/355 |
| 4,722,920 | 2/1988 | Kimura et al. | 502/439 |
| 4,990,266 | 2/1991 | Vorlop et al. | 210/748 |
| 5,122,496 | 6/1992 | Vorlop et al. | 502/245 |

*Primary Examiner*—Shrive Beck
*Assistant Examiner*—Fred J. Parker
*Attorney, Agent, or Firm*—Evenson, McKeown, Edwards & Lenahan

[57] ABSTRACT

The description relates to a particularly abrasion-resistant catalyst carrier of special activated aluminum oxide. The aluminum oxide consists of either the "gamma" or the "kappa" modification and has no "delta" modification, or it consists of the "kappa" and "theta" modifications and has no "alpha" modification. Carrier catalysts which contain catalytically active metals and/or metal compounds on the abrasion-resistant carrier are especially suitable for use in fluidized bed processes.

14 Claims, 6 Drawing Sheets

FIG.1

FIG. 2 (EXAMPLE 1)

FIG. 3 (EXAMPLE 2)

FIG. 4 (EXAMPLE 3)

FIG. 5 (EXAMPLE 4)

FIG. 6 (EXAMPLE 5)

FIG. 7 (EXAMPLE 6)

FIG. 8 (EXAMPLE 7)

FIG. 9 (EXAMPLE 8)

FIG. 10 (EXAMPLE)

ABRASION-RESISTANT CATALYST CARRIER FORMED OF TRANSITION ALUMINAS

BACKGROUND OF THE INVENTION

The invention relates to an abrasion-resistant catalyst carrier, carrier catalysts produced by means of these catalyst carriers and their use.

It is known that catalyst carriers may be produced from various materials. Very often, activated aluminum oxide is used as the carrier. Typically, it will then be present in the "gamma" modification. A disadvantage of previously known carriers made of aluminum oxide is their relatively low abrasion resistance.

SUMMARY OF THE INVENTION

It is an object of the present invention to provide a catalyst carrier with an improved abrasion resistance. This object is achieved by the abrasion-resistant catalyst carrier indicated in the claims.

The catalyst carrier according to the invention consists essentially of aluminum oxide ($Al_2O_3$) and has the following characteristics:

aI) It consists of aluminum oxide of the "gamma" and "kappa" modifications, in which case the "delta" modification may possibly be contained as a contaminant present in an amount from 0 to maximum of 10 wt-%, or aII) it consists of aluminum oxide of the "theta" and "kappa" modifications, in which case the "alpha" modification may possibly be contained as a contaminant present in an amount from 0 to a maximum of 10 wt-%;

b) the distribution of the pore diameters has one maximum (monomodal pore distribution) or two maxima (bimodal pore distribution) in the range of between 100 and 1,500 Å;

c) the specific surface calculated according to the mercury porosimetry method is between 33 and 63 $m^2/g$.

Catalyst carriers which have the above-mentioned characteristics are distinguished by a very high abrasion resistance.

DETAILED DESCRIPTION OF PREFERRED EMBODIMENTS

According to one variant, the carrier consists of the "gamma" and "kappa" modifications. Their weight ratio is preferably between 34:66 and 23:77.

According to the other, particularly preferred variant, the carrier consists of the "kappa" and "theta" modifications. Their weight ratio is preferably between 30:70 and 10:90.

The carrier may be present in conventional carrier forms, as a monolith or as a bulk material carrier of conventional shapes, for example, in the form of hollow spheres, cylinders, hemispheres, as powder, etc. Preferably, it is present in a spherical shape. The diameter of the spheres is expediently between 0.1 mm and 20 mm, preferably between 0.1 and 1.0 mm and particularly between 0.3 and 0.8 mm.

A particularly preferred catalyst carrier is characterized in that it is completely free of aluminum oxide of the "gamma" and "delta" modifications, that the "alpha" modification is possibly contained as a contaminant present in small amounts, that the distribution of the pore diameters has a maximum (monomodal pore distribution) in the range of from 700 to 1,500 Å or two maxima (bimodal pore distribution) in the range of from 100 to 1,500 Å, that the median pore diameter amounts to from 300 to 500 Å and the specific surface calculated according to the mercury method is between 41 and 50 $m^2/g$.

This catalyst carrier is very advantageous because it permits a good diffusion of the material to be treated catalytically into the interior areas.

In the following, the production of the catalyst carrier according to the invention will be described.

The process according to the invention for the production of the catalyst carrier according to the invention which consists essentially of aluminum oxide $Al_2O_3$) and whose distribution of the pore diameters has a maximum (monomodal pore distribution) or 2 maxima (bimodal pore distribution) in the range of between 100 and 1,500 Å and whose specific surface calculated according to the mercury method amounts to between 33 and 63 $m^2/g$, wherein amorphous aluminum oxide ("chi" modification) is mixed with aluminum oxide hydrate with the exception of β-aluminum oxide monohydrate, preferably with the addition of water, is brought into the desired shape and calcined, wherein aI) in order to produce a catalyst carrier consisting of aluminum oxide of the "gamma" and "kappa" modifications, in which the "delta" modification may possibly be present as a contaminant in an amount from 0 to a maximum of 10 wt-%, calcining takes place at temperatures between 700° C. and 1,020° C., preferably between 780° C. and 860° C., aII) in order to produce a catalyst carrier consisting of aluminum oxide of the "theta" and "kappa" modifications, in which the "alpha" modification may possibly be present as a contaminant in an amount from 0 to a maximum of 10 wt-%, calcining takes place at temperatures between 1,020° C. and 1,070° C.

Alpha aluminum monohydrate may preferably be used as aluminum oxide hydrate. Other hydrates, such as alpha trihydrate or beta trihydrate may also be used. Those aluminum oxide modifications which immediately convert to the alpha modification, such as beta aluminum oxide monohydrate, will not be used.

In order to produce a carrier consisting of "gamma" and "kappa" modifications, a relatively short calcining duration is sufficient. Thus, calcining may take place, for example, for 1.5 to 2.5 hours.

In order to produce a carrier consisting of the "theta" and "kappa" modifications, calcining expediently takes place for an extended period of time, for example, for approximately 3.5 to 6 hours.

The is true that the maximum of the pore diameters and the average pore diameter are displaced toward higher values the higher the calcining temperature and the longer the calcining duration. The specific surface will decrease, the higher the calcining temperature and the longer the calcining duration.

The amorphous aluminum oxide used as the starting material is advantageously present in a finely distributed form; for example, in the form of particles with a diameter of less than 1 micrometer.

The water content of the amorphous aluminum oxide is between 3 and 8% by weight. Amorphous aluminum oxide with the trade name HLS$^R$ of the firm Martinswerk GmbH, Bergheim, was found to be particularly useful. This is a rehydratable amorphous aluminum oxide with an aluminum oxide content of 96%. The content of sodium oxide is between 0.2 and 0.35%; the water content is approximately 4%. It has very fine particles; 99% of the particles have a diameter of less than 1 micrometer. The specific surface amounted to approximately 200 m$^2$/g.

The other aluminum oxide starting material, preferably alpha aluminum oxide monohydrate (boehmite, pseudoboehmite), is advantageously present in the form of particles with a diameter below 100 micrometers. The commercial products PURAL NF® and PURAL SB® of the firm Condea Chemie, Brunsbuettel, as well as the commercial product CATAPAL B® of the firm Vista Chemical Company were found to be particularly suitable. PURAL NF® is a boehmite (alpha aluminum oxide monohydrate) with 70% aluminum oxide, maximally 0.005% sodium oxide. The specific surface after a three-hour activation at 550° C. amounts to at least 160 m$^2$/g. At least 99% of the particles have a diameter of less than 100 micrometers. The commercial product PURAL SB® consists typically of 75% aluminum oxide; and the sodium oxide content typically amounts to 0.002%. PURAL SB® is also a boehmite; after a three-hour activation at 550° C., its specific surface typically amounts to 250 m$^2$/g. At least 90% of the particles have a particle size of less than 90 micrometers. The commercial product CATAPAL B® consists of small boehmite crystallites which are often called pseudoboehmite. It typically consists of 70.7% aluminum oxide; the sodium oxide content is typically maximally 0.004%. 85% of the particles have a diameter of less than 90 micrometers. After a one-hour activation at 500° C., the specific surface typically amounts to 273 m$^2$. CATAPAL B® is particularly suitable for the production of catalyst carriers of a bimodal pore structure.

The mixing ratio of amorphous $Al_2O_3$ to $Al_2O_3$-hydrate preferably amounts to 33.69:20.50 to 44.21:7.17.

According to a preferred variant of the catalyst carrier according to the invention, the "gamma" and "kappa" modifications are present at a weight ratio of 34:66 to 23:77. In order to produce such a carrier, amorphous aluminum oxide and aluminum oxide hydrate are mixed at a weight ratio of from 27.90:15.17 to 42.11:9.83. As mentioned above, calcining takes place between 700° C. and 1,020° C., preferably between 780° C. and 860° C.

According to another preferred variant of the carrier, the "theta" and "kappa" modifications are present at the weight ratio of 30:70 to 10:90, particularly 25:75 to 15:85. In order to produce such a carrier, amorphous aluminum oxide and aluminum oxide hydrate are mixed at the weight ratio of 37.90:15.17 to 42.11:9.83. Calcining takes place between 1,020° C. and 1,070° C.

As mentioned above, a particularly preferred catalyst carrier according to the invention is completely free of aluminum oxide of the "gamma" and "delta" modifications; in the case of a monomodal pore distribution in the range of from 700 to 1,500 Å, or in the case of a bimodal pore distribution, it exhibits 2 maxima in the range of from 100 to 1,500 Å; the median pore diameter is between 300 and 500 Å, and the specific surface is between 41 and 50 m$^2$/g. For its production, amorphous aluminum oxide and alpha aluminum oxide hydrate are mixed with one another and are calcined for 4.5 to 6.5 hours at a temperature of from 1,045° to 1,055° C.

As far as the shape of the catalyst carrier is concerned, the starting material can be brought into any shape into which ceramic carrier material can be charged in a conventional manner. Thus, it can be shaped into a monolithic carrier. It can also be shaped into the form of bulk material, such as into cylinder shapes, extruded shapes, cube shapes, hemispherical shapes, hollow-sphere shapes and other shapes. It is preferably provided with a spherical shape. This advantageously takes place according to the "build-up granulation" method. This method is described in the publication by W. Peach in "Aufbereitungs-Technik" (Processing Technology) 4 (1966), Pages 177 to 191, as well as in EP-A-0 176 476 (U.S. Pat. No. 4,637,908).

First, a mixture is produced of amorphous aluminum oxide and preferably alpha aluminum oxide monohydrate, and with the addition of water, the mixture is subjected to a build-up granulation on a rotary plate. It is advantageous to add undersize particles and crushed oversize particles from an earlier build-up granulation as nucleation agents. The spherical aluminum oxide produced by build-up granulation will then advantageously be aged by being allowed to stand, and the desired fraction will be sifted out. The undersize particles and, after a corresponding crushing, the oversize particles, as mentioned above, may be returned as nucleation agents into the granulation. The product obtained by the build-up granulation will then dried and will be calcined, as described above, and converted to the catalyst carrier material according to the invention.

The calcining time and calcining temperature parameters which are important for the adjustment of the desired characteristics may fluctuate slightly as a function of the respective starting material which is used. If desired, the ideal process parameters may be determined by several preliminary tests. If, for example, the proportion of the "delta" modification is undesirably high, the calcining temperature will be lowered in order to increase the proportion of "gamma" and "kappa" modification, or the temperature is raised and the proportion of "theta" and "kappa" modification is increased. If the proportion of "alpha" modification is too large, the calcining temperature will be lowered. In order to displace the pore maximum or maxima and the median pore diameter toward higher values, the calcining temperature may be increased or the calcining duration may be extended. In the opposite case, the calcining temperature is reduced or the calcining duration is shortened. The respective proportion of the modifications can be determined by x-ray diffraction; the specific surface, the pore volume and the pore distribution are determined by mercury porosimetry. The maxima of the pore diameters and the median pore diameter may be determined from the above.

If desired, the aluminum oxide may be pre-tempered before the calcining, for example, for several hours. Thus, pre-tempering may take place for 2 to 6 hours at temperatures between 550° and 650° C.

An advantage of the build-up granulation process is the fact that the aluminum oxide can be rolled to form particles of very variable diameters. Thus, in principle, the diameter may range from less than, for example, 0.1 to more than, for example, 10 mm. Preferably, spherical particles are rolled which have a diameter of from 0.1 to 1.0 mm, particularly from 0.3 to 0.8 mm. In the case of this method, the particle spectrum has a very small range of dispersion; the largest and the smallest particles do not vary in their diameters by more than 0.2 mm. Naturally, in the course of the production process, the particles may also be divided, for example, by means of sieving.

The invention also relates to carrier catalysts which can be obtained by the application of one or several catalytically active metals and/or metal compounds to the carrier according to the invention. Spherical carrier catalysts are preferred which have a diameter of from 0.1 to 1.0 mm, preferably 0.3 to 0.8 mm. Naturally,—see above—carriers of a larger or smaller diameter may also be used.

In principle, the carrier catalysts according to the invention may contain any desired catalytically active metal or metal compounds, as they are used for many varied purposes in the form of carrier catalysts. They may, for example, contain precious metals, such as gold or silver; platinum group metals, such as platinum, rhodium or palladium or transition metals, such as copper. The content of such metals is advantageously in the range of from 0.1 to 5% by weight relative to the finished carrier catalyst. Optionally, it may also be larger or smaller. Furthermore, metal compounds, such as oxides of metals, particularly oxides of transition metals, such as oxides of manganese, iron, nickel or cobalt, may also be contained. Their amount is advantageously also within the range of from 0.1 to 5% by weight. However, the content may also be larger, specifically up to 10% by weight and more.

Naturally, mixtures of metals, mixtures of metal compounds or mixtures of one or several metals or one or several metal compounds may also be applied to the carrier.

Carrier catalysts according to the invention, which comprise platinum group metals, such as platinum or palladium and, if desired, also copper, are suitable, for example, for the removal of oxygen in water. Low-oxygen water or oxygen-free water is used, for example, for the production of alcoholic or non-alcoholic beverages. Low-oxygen water also has the advantage of a lower corrosiveness and is therefore used, for example, as cooling water. For the reduction of the oxygen, the water containing oxygen is [mixed] with elemental hydrogen gas, preferably at a normal pressure or an elevated pressure, and then conducted through a carrier catalyst according to the invention which contains platinum, rhodium or palladium and, optionally, copper on a carrier according to the invention. Spherical carrier catalysts are particularly suitable because the oxygen elimination in the fluidized bed can be carried out particularly well by means of them.

Another carrier catalyst according to the invention, preferably in a spherical shape, is suitable for the removal or reduction of the nitrite content and/or nitrate content of nitrite-laden and/or nitrate-laden water with the selective formation of nitrogen. This carrier catalyst comprises a porous carrier which is impregnated with a metal constituent consisting of palladium and/or rhodium or of palladium and a metal of the copper group. The carrier consists of the "theta" and "kappa" modification, in which case the "alpha" modification may possibly be present as a contaminant in small amounts. The carrier will be completely free of the "gamma" and "delta" modification. The carrier also has a pore diameter maximum in the range of from 700 to 1,500 Å or 2 pore diameter maxima in the range of from 100 to 1,00 Å; the median pore diameter amounts to 300 to 500 Å and the specific surface is between 41 and 50 m²/g. Such a catalyst, whose metal constituent consists of palladium and/or rhodium, is suitable for the treatment of only nitrite-laden water. A catalyst, whose metal constituent consists of palladium and a metal of the copper group or of rhodium and optionally palladium, is suitable for the treatment of water which also contains nitrate. Copper is preferably used as the metal of the copper group; the proportion of the metal constituent in the overall catalyst is between 0.1 and 10% by weight. If copper is contained, the weight ratio of palladium to copper will be between 2:1 and 8:1. The use of such a special carrier catalyst for the removal or reduction of the nitrite content and/or nitrate content of nitrite-laden and/or nitrate-laden water, with the selective formation of nitrogen, may take place analogously to the process described in European Patent Document EP-A-0 359 074 (U.S. Pat. No. 4,990,266). In each process, hydrogen gas is introduced into the water, for example, by means of gas saturators or the known permeation gasification. One can operate at normal pressure or at a slight excess pressure, for example, up to 10 atmospheres. The pH-value of the water to be treated can be regulated to a range of approximately 2 to 8. This process is preferably carried out as a fluidized bed process.

Catalysts comprising palladium are suitable, for example, for the decomposition of ozone; catalysts having a combination of gold and iron oxide, nickel oxide or cobalt oxide are suitable for the oxidation of carbon monoxide.

Catalysts and catalyst carriers are so stable that they can also be used under extreme conditions; for example, at temperatures of up to 120° C. and more and pressures of up to 40 bar and more.

The production of the carrier catalysts according to the invention may take place in a known manner. For example, metal salts or complex metal compounds may be applied to the carrier material in an immersion process, a spraying process or a precipitation process, and after drying and subsequent calcining may be reduced, as desired. The carrier material may be immersed or sprayed and dried, for example, with a solution or suspension of metal salts or complex metal compounds in water or an organic solvent, such as a lower alcohol, such as ethanol, or ketone or a mixture thereof. After the drying, if desired, calcining may also take place at temperatures of up to 600° C., for example, between 300° and 600° C. If desired, a reduction may follow by means of a reducing agent which is free from metal, preferably hydrogen or optionally also another reducing agent, such as hydrazine, formaldehyde, carbon monoxide or methane with a thermal treatment at temperatures in the range of up to 550° C., for example, between approximately 100° and 550° C.

In order to produce carrier catalysts with oxidic metal compounds, calcining may take place in air or in an oxygen atmosphere at temperatures of up to 600° C. Advantageously, metal nitrates, metal chlorides or metal hydroxides are used as the basis.

A special characteristic of the catalyst carrier according to the invention, particularly of the spherical catalyst carriers, is their high abrasion resistance. Correspondingly, the carrier catalysts produced using the catalyst carriers according to the invention also have an advantageously high abrasion resistance. They can therefore be used very well in processes which are carried out in the fluidized bed.

The following examples are intended to further illustrate the invention without limiting its scope.

EXAMPLES

General:

The catalyst carrier, whose production will be described in the following examples, was subjected to a test, in which the relative abrasion resistance of several carriers could be compared with one another. This determination of the relative abrasion resistance was carried out as follows:

1.0 g respectively of the material to be tested was weighed into a 10 ml snap cover glass (45×22 mm) and were rinsed twice with 5 ml deionized water (VE-water) in order to remove possibly adhering dust. The water adhering to the surface was suctioned off by means of a capillary tube so that only the water situated in the pores remained in the material. Then 5 ml VE-water were added again and the closed glass was shaken for 1 minute on a test glass shaker (Firm Heidolf, Reax 1R) at 2,400 revolutions per minute. 2 ml of the supernatant solution were then immediately transferred to a 10 mm vessel and the extinction value E was measured several times after a repeated shaking at $\pi$=500 μm (CADAS 100 Spectrophotometer, firm Dr. Lange). At E-values which are higher than 1, the sample must be diluted correspondingly, in which case the measured values are linear.

Under these test conditions, mechanically stable and therefore abrasion-resistant carriers or catalysts have E-values in the range of from 0.1 to 0.7.

Example 1

Production of Aluminum Oxide Carriers with a Monomodal Pore Distribution, Maximum of the Pore Diameter at 850 Å

The build-up granulation method was used. 140 kg nucleation agents (undersize particles from an earlier build-up granulation with 70% by weight aluminum oxide and 30% by weight of water, particle size smaller than 0.5 mm) were sprayed with 3 l water.

Subsequently, 105 kg of an aluminum oxide mixture were produced in that amorphous, highly dispersed oxide of aluminum (Commercial Product HLS® of the firm Martinswerk, Bergheim) and aluminum oxide of the boehmite type (commercial product Condea Pural SB® of the firm Condea, Brunsbuettel) were mixed with one another at a weight ratio of 40:12.5. Together with the 140 g of nucleation agent, this aluminum oxide mixture was charged into a rotary plate. Over the course of 4 hours, approximately 32.6 kg water were added to the rotating mass by spraying.

Then another 132 g of the above-described aluminum oxide mixture at the indicated weight ratio of amorphous aluminum oxide and aluminum oxide of the boehmite type were added to the mass situated in the rotary plate. Over the course of 2.5 hours, another 42 kg water were added by spraying to the rotating mass. Then the mass was rotated for another 20 minutes and was aged for 16 hours in the stopped rotary plate.

With the metered addition of 3 kg water, the aged mass was rotated again for 15 minutes in the rotary plate and was then sieved. Undersize particles (particle diameter smaller than 0.5 mm) and oversize particles (particle diameter larger than 0.68 mm) after being crushed were recycled as nucleation agents into a later build-up granulation.

The fraction with a particle size of from 0.5 to 0.68 mm was then dried for 16 hours at 150° C.

Yield:

188 kg dried material of the composition of 85% by weight aluminum oxide, balance water.

10 kg material were then removed from the pre-dried material and were first pre-dried for 4 hours at 600° C. and then calcined for 5 hours at 1,050° C.

Yield:

8.5 kg spherical aluminum oxide, consisting of "theta" and "kappa" modifications with traces of the "alpha" modification. The material was free of the "gamma" and "delta" modifications.

Figure 2:
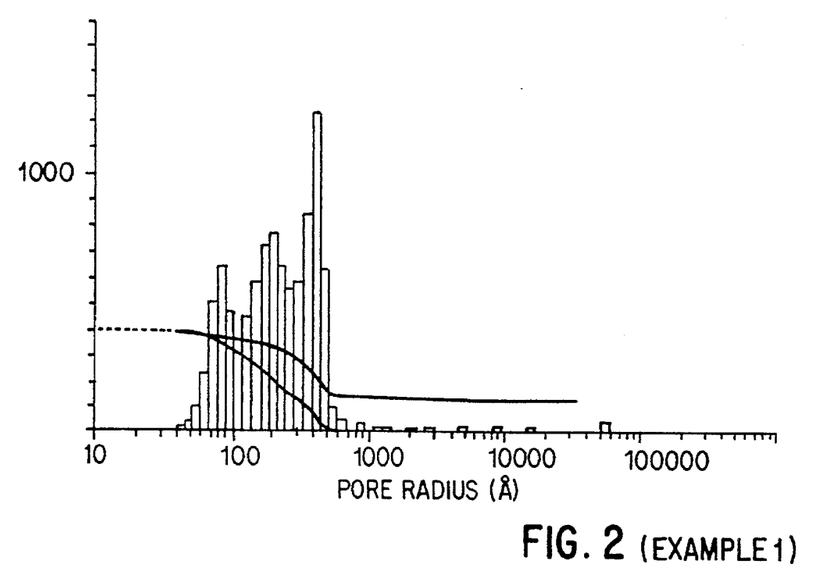
FIGS. 2 through 9 are graphs illustrating the pore diameter distribution of the catalyst carriers of Examples 1 through 8, respectively.

Maximum of the Pore Diameter: 850 Å. The diameters of the pores are in the range of between 60 Å and 1,800 Å as shown in FIG. 2.

Relative abrasion number: 0.63

Specific surface measured according to the mercury porosimetry method: 45 m²/g,

Pore volume: 0.40 ml/g

Median pore diameter: 356 Å.

Example 2

Production of a monomodal carrier with a maximum of the pore diameter at 500 Å.

10 kg material of the starting material produced according to Example 1 were first pre-dried for 6 hours at 600° C. and then calcined for 4 hours at 1,030° C.

Yield:

8.5 kg spherical aluminum oxide. It consisted of the "theta" and "kappa" modifications; traces of the "delta" and "alpha" modifications were found.

Figure 3:
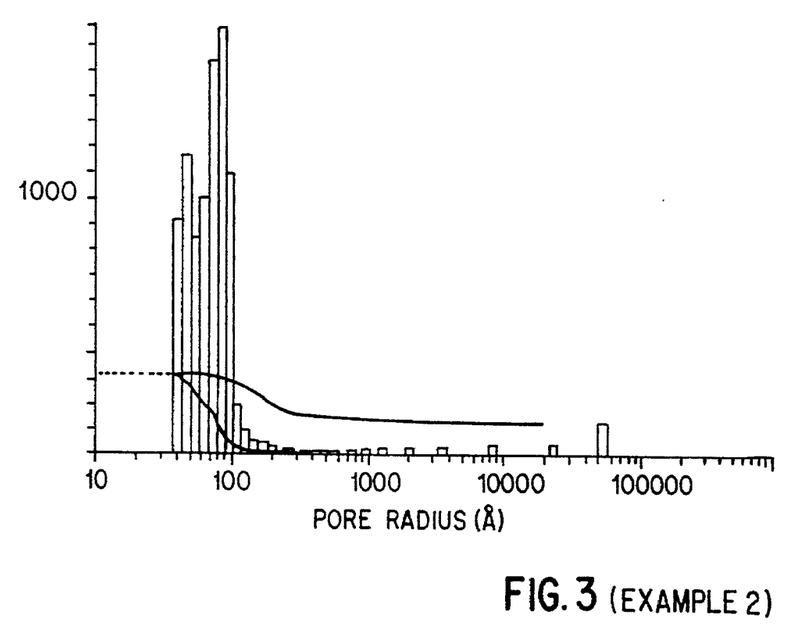

Maximum of the Pore Diameter: 500 Å. The diameters of the pores were distributed in the range between 70 Å and 1,200 Å as shown in FIG. 3.

Relative abrasion number: 0.40

Specific surface: 63 m²/g,

Pore volume: 0.42 ml/g

Median pore diameter: 267.

Example 3

Production of a monomodal carrier With a maximum of the pore diameter at 950 Å.

10 kg of the starting material produced according to Example 1 were initially pre-dried for 4 hours at 600° C. and then calcined for 6 hours at 1,050° C.

Yield:

8.5 kg spherical aluminum oxide. It consisted of the "theta" and "kappa" modifications; the "alpha" modification could be found only in traces.

Figure 4:
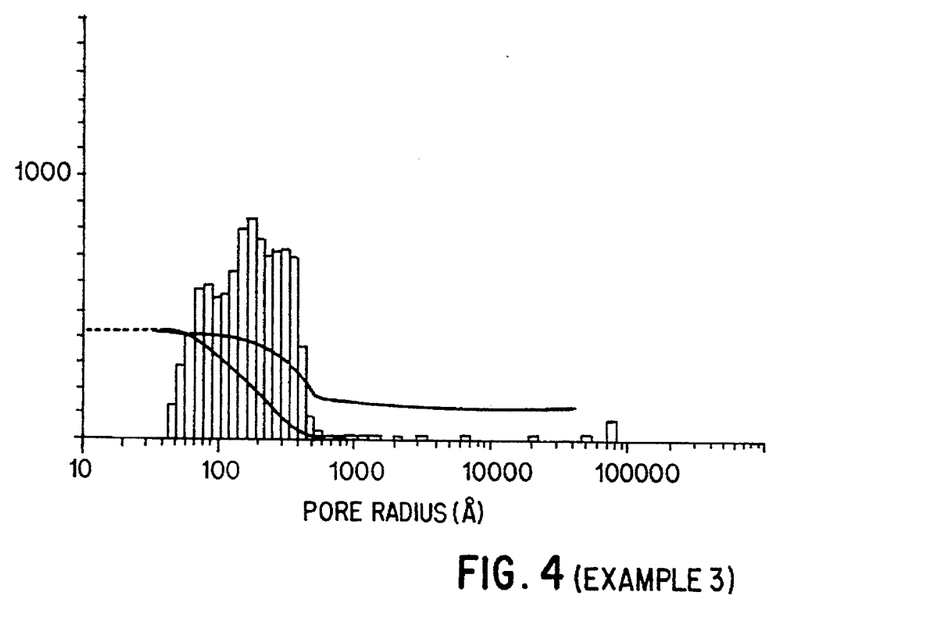

Maximum of the Pore Diameter: 950 Å. The diameters of the pores were distributed in the range between 80 Å and 1,800 Å as shown in FIG. 4.

Relative abrasion number: 0.64

Specific surface: 35 m²/g,

Pore volume: 0.39 ml/g

Median pore diameter: 446 Å.

Example 4

Production of a monomodal carrier With a maximum of the pore diameter at 850 Å.

Example 1 was repeated. Instead of the aluminum oxide of the Pural SB® trade name, the commercial product Pural NF® (also a boehmite) of the firm Condea-Chemie was used as the aluminum oxide.

10 kg of the dried material produced analogously to Example 1 were used as the starting material. Again, the material was initially pre-dried for 4 hours at 600° C. and then calcined for 5 hours at 1,050° C.

Yield:

8.5 kg spherical aluminum oxide. It consisted of the "theta" and "kappa" modifications; the "alpha" modification could be found only in traces.

Figure 5:
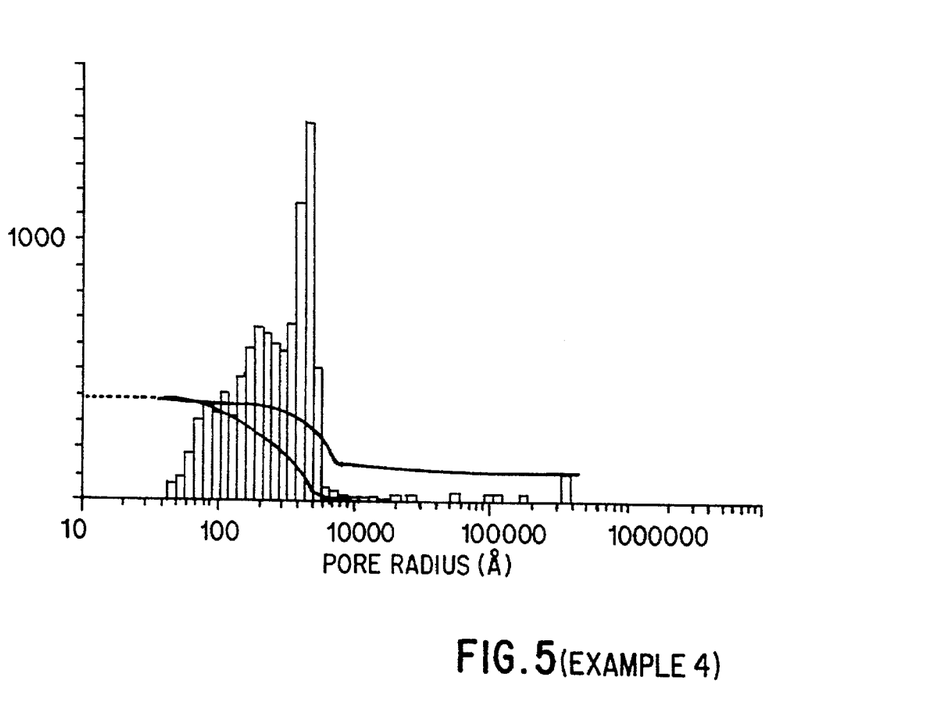

Maximum of the Pore Diameter: 850 Å. The diameters of the pores were distributed in the range between 80 Å and 1,400 Å as shown in FIG. 5.

Relative abrasion number: 0.44

Specific surface: 46 m²/g,

Pore volume: 0.39 ml/g

Median pore diameter: 339 Å.

Example 5

Figure 6:
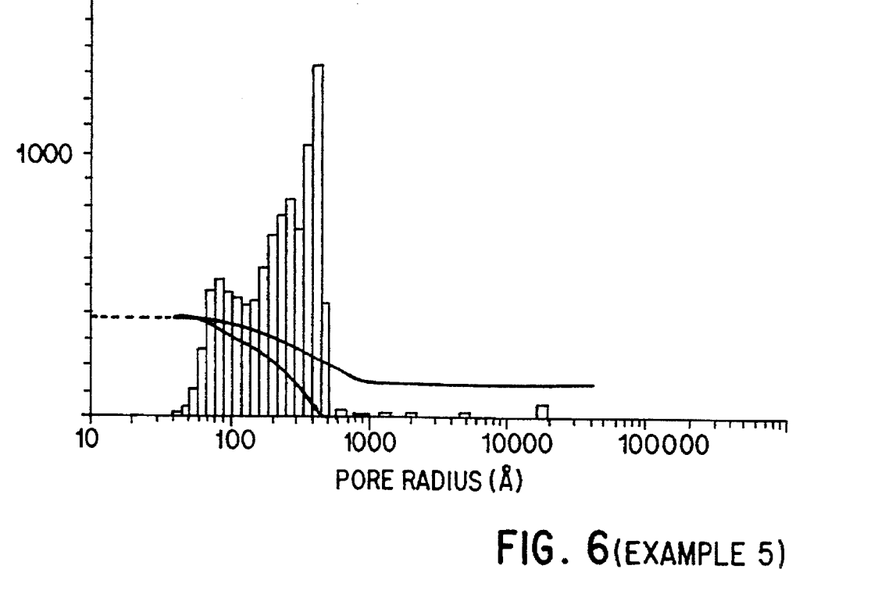
Figure 7:
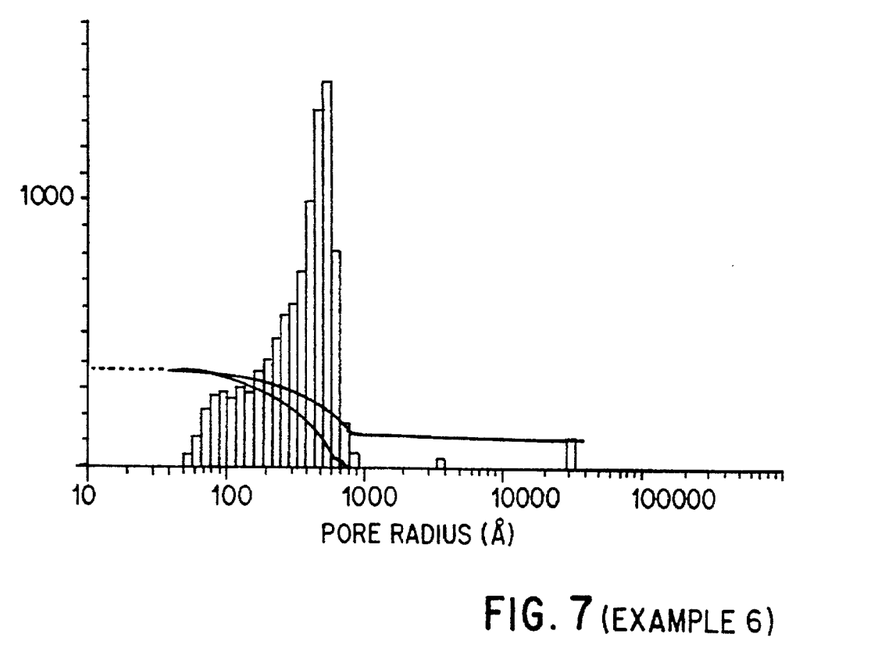

Production of a monomodal carrier with a maximum of the pore diameter at 1,000 Å as shown in FIG. 6.

10 kg of the starting material produced in Example 5 were first pre-dried for 4 hours at 600° C. and then calcined for 6 hours at 1,050° C.

Yield:

8.5 kg spherical aluminum oxide. It consisted of the "theta" and "kappa" modifications; the "alpha" modification could be found only in traces.

Maximum of the Pore Diameter: 1,000 Å. The diameters of the pores were distributed in the range between 100 Å and 1,800 Å as shown in FIG. 6.

Relative abrasion number: 0.69

Specific surface: 33 m$^2$/g,

Pore volume: 0.42 ml/g

Median pore diameter: 509 Å.

Example 6

Production of a bimodal carrier with pore diameter maxima at 115 and 1,400 Å.

First, starting material was produced analogously to Example 1. Instead of the aluminum oxide PURAL SB®, CATAPAL B® of the firm Vista Chemical Company was used.

10 kg of the dried material produced analogously to Example 1 as the starting material were first pre-dried for 4 hours at 600° C. and then calcined for 5 hours at 1,050° C.

Yield:

8.5 kg spherical aluminum oxide. It consisted of the "theta" and "kappa" modifications; the "alpha" modification could be found only in traces.

Maxima of the Pore Diameters: 150 Å and 1,400 Å. The diameters of the pores were distributed in the range between 80 Å and 4,000 Å as shown.

Relative abrasion number: 0.50

Specific surface: 41 m$^2$/g, Pore volume: 0.46 ml/g

Median pore diameter: 449 Å.

Example 7: (Comparative Example)

10 kg of the starting material produced according to Example 1 were first pre-dried for 4 hours at 600° C. and then calcined for 2 hours at 900° C.

Yield:

8.5 kg spherical aluminum oxide. It consisted of the "delta" and "kappa" modifications; the "gamma" modification could be detected in small amounts.

Figure 8:
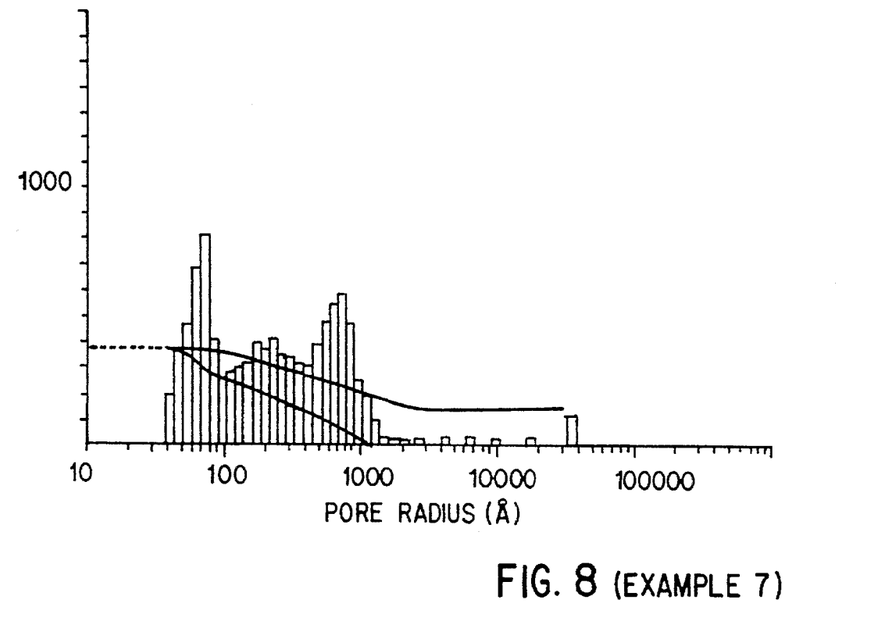

Maximum of the Pore Diameter: 220 Å (FIG. 8).

Relative abrasion number: 1.03

Example 8: (Comparative Example)

10 kg of the starting material produced according to Example 1 were first pre-dried for 4 hours at 600° C. and then calcined for 4 hours at 1,100° C.

Yield:

8.5 kg spherical aluminum oxide. It consisted of the "alpha" modification; the "theta" and "kappa" modifications could be found in small amounts.

Figure 9:
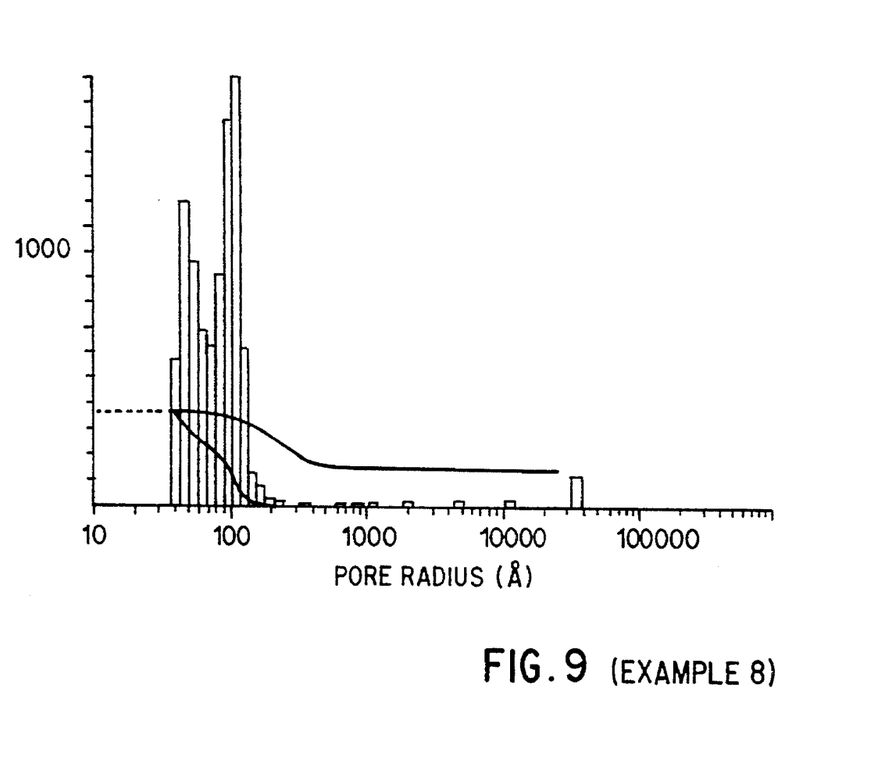
Figure 10:
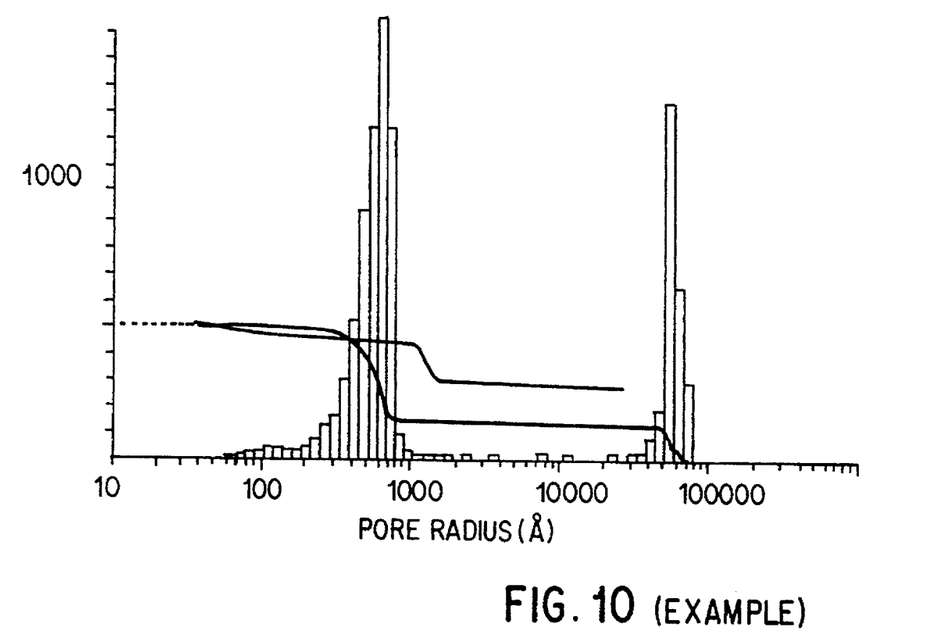

Maxima of the Pore Diameters: 1,260 Å and 110,000 Å (FIG. 9).

Relative abrasion number: 1.9

It can be seen from Examples 1 to 8 that the relative abrasion number as the measurement of the abrasion resistance will have satisfactory values (i.e., will be below 0.7) if care is taken during the calcining that the "delta" modification or the "alpha" modification arises in the carrier at most in undesirable, small proportions.

Example 9

Production of Carrier Catalysts.

The carrier material was used which was produced according to Example 1. A fraction was used with a particle size range of from 400 to 680 micrometers and a proportion of oversize and undersize particles which is each lower than 3%, which was found to be particularly advantageous. The particle size distribution within the range of from 400 to 680 micrometers followed the normal distribution.

The catalysts were produced by application of the catalytically active metal compounds on the carrier material, whereby one of the following methods was used.

a) In a 250 ml round flask, 30 g of the carrier material of the above-mentioned fraction produced according to Example 1 were charged into 219 ml of an aqueous tetraammonium palladium(II) hydroxide solution with a palladium content of 2.74 g/l, that is, a total content of 0.6 g palladium.. During a time period of 2 hours, the solution was concentrated to dryness at 60° C. and 30 mbar; the resulting impregnated carrier was dried for 1 hour at 110° C., and the dried carrier was calcined for 0.5 hours at 550° C. The application of copper took place under analogous conditions. In order to prepare the copper salt solution, 0.47 g copper(II) acetate monohydrate (corresponding to 0.15 g copper) were dissolved in 100 ml deionized water. The impregnated carrier was then dried for 2 hours at 110° C. In order to reduce the metals, the impregnated and dried carrier for subjected to a hydrogen atmosphere for 8 hours at 350° C. in an externally heated quartz tube.

According to the analysis, the finished catalyst had a palladium content of 2.0±0.05% by weight and a copper content of 0.5±0.02% by weight. The relative abrasion number corresponded to the abrasion number of the carrier material.

b) 50.42 g of the carrier material of the above-mentioned fraction produced according to Example 1 were charged into a solution of 1.68 g palladium dichloride, which corresponds to 1.0 g palladium, in 11.75 ml 1-molar hydrochloric acid and 22.7 ml acetone in a 250 ml round flask. While connected to a rotary evaporator, the solution was stirred for 30 minutes. The solvents were evaporated during a period of 60 minutes at 60° C. and 50 mbar. The carrier impregnated with palladium was then dried for 1 hour at 150° C. and was calcined for 0.5 hours at 550° C. In order to apply copper, the carrier impregnated with palladium was placed in a solution of 0.79 copper(II) acetate monohydrate, which corresponds to 0.25 g copper, in 30 ml water, and treated as described above in the rotary evaporator. The carrier impregnated with palladium and copper was then dried for 1 hour at 100° C. and was finally reduced, as described in a).

The analysis corresponded to the values obtained according to method a).

In a completely analogous manner, carrier catalysts were produced which contained palladium and copper as active metals, in which case carrier material was used which had been produced according to Examples 2 to 6. All these catalysts are suitable for the catalytic removal of oxygen with the gasification with hydrogen from oxygen-containing water or aqueous preparations, as used, for example, for the manufacture of beverages.

Example 10

Use of the carrier catalyst containing palladium and copper based on the carrier material produced according to Example 1, for the removal of oxygen and nitrate from water in a fluidized bed.

Equipment Used:

An untreated water line led first into a mechanical filter and then into a pressure increasing device. From the pressure increasing device, a line led into a gasification reactor. In this gasification reactor, hydrogen could be charged through silicone membranes into the water. The gasification reactor was connected to a reactor in which the catalytic oxygen and nitrate decomposition was carried out. This reactor contained 22 kg of the palladium-containing and copper-containing carrier catalyst produced according to Example 9 using carrier material of Example 1 and contained palladium and copper. An outlet line for the treated water, which leads out of the reactor, led into a suspended material filter (air filter). The water leaving the suspended material filter could then be supplied as clean water to the intended use.

Implementation of Test:

The test was carried out over a period of more than 9 weeks in a waterworks facility in Lower Saxony. The nitrate content of the untreated water (ground water) fluctuated between 40 mg and 60 mg per liter. The oxygen content amounted to 4.2 mg/l. The temperature of the untreated water amounted to 11° C.

Figure 1:
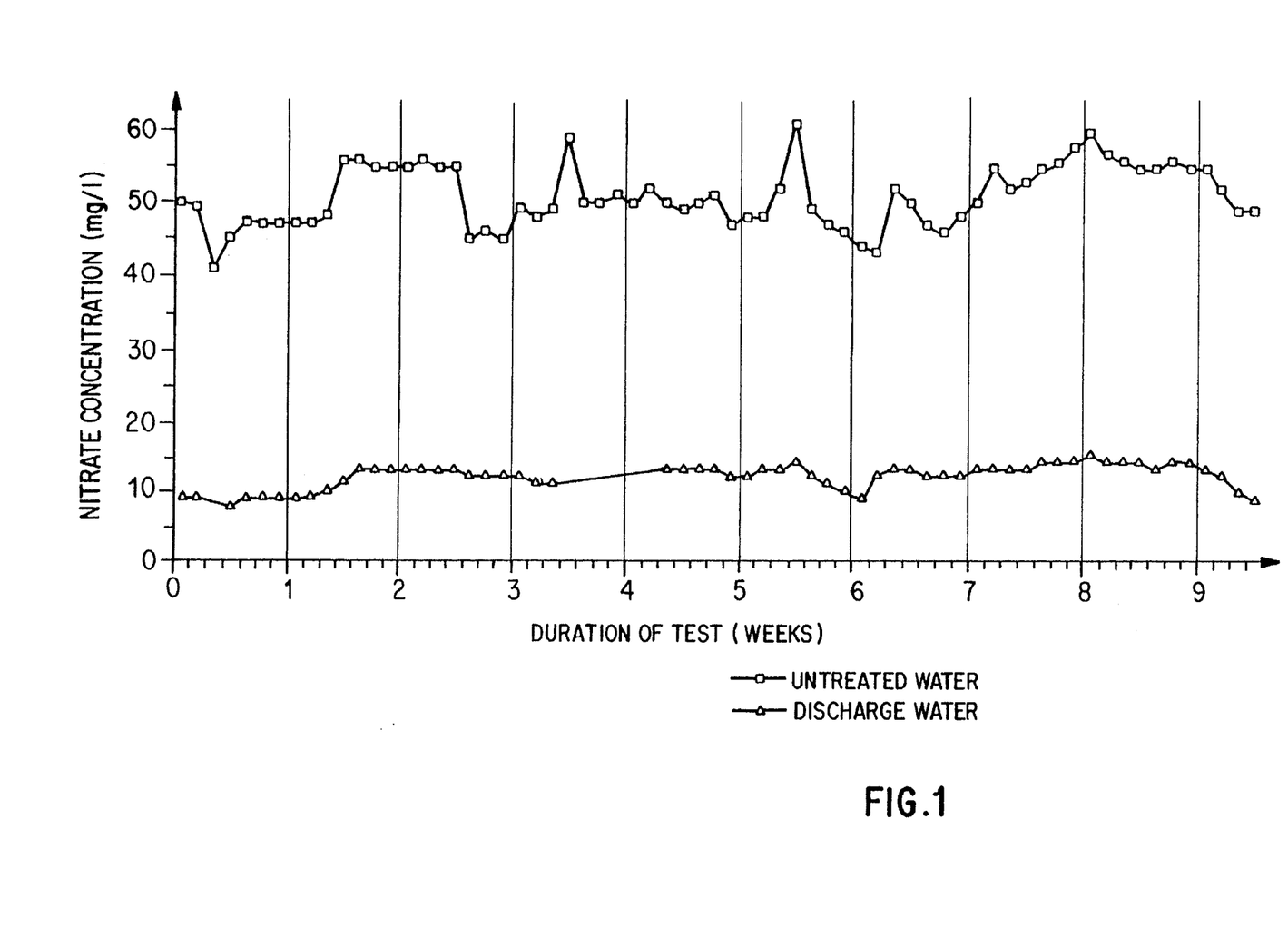
FIG. 1 is a graph illustrating the nitrate content of untreated and catalytically treated ground water.

The raw water was first guided through the suspended material filter and was then brought to a water pressure of 5 bar in the pressure increasing device. In the gasification reactor, the water was gasified with hydrogen. The hydrogen-laden water was conducted at a flow rate of 2,000 l per hour through the reactor in which the carrier catalyst material was held in the fluidized bed. The nitrate content of the nitrate-laden ground water to be treated as well as the nitrate content of the treated ground water were recorded over the period of more than 9 weeks. FIG. 1 illustrates the nitrate concentrations of the untreated and of the treated ground water which were determined by means of a plurality of measurements. The nitrate decomposition output could be determined at 3.5 g nitrate per kilogram catalyst and hour. As indicated in FIG. 1, the catalyst is stable for months and constantly delivers good results even in the case of fluctuating amounts of nitrate.

Some analysis data of the untreated and treated ground water are compiled in the following table.

FIGS. 2 to 10 illustrate the distribution of the pore diameters in the carrier material of Examples 1 to 8.

TABLE 1

Analysis Data of the Untreated and Treated Ground Water

| Parameter | Untreated Ground Water | Treated Ground Water |
| --- | --- | --- |
| pH-value | 7.10 | 7.65 |
| $O_2$-content | 4.2 mg/l | <20 micrograms |
| nitrate | 59 mg/l | 11 mg/l |
| nitrate | <0.1 mg/l | <0.1 mg/l |
| chloride | 102 mg/l | 101 mg/l |
| sulfate | 149 mg/l | 152 mg/l |

TABLE 1-continued

Analysis Data of the Untreated and Treated Ground Water

| Parameter | Untreated Ground Water | Treated Ground Water |
| --- | --- | --- |
| ammonium | <0.05 mg/l | <0.05 mg/l |
| calcium | 172 mg/l | 175 mg/l |
| iron | <0.05 mg/l | <0.05 mg/l |
| manganese | <0.05 mg/l | <0.05 mg/l |

We claim:

1. A catalyst carrier consisting essentially of aluminum oxide ($Al_2O_3$), wherein said aluminum oxide
   aI) consists essentially of "gamma" and "kappa" modifications of aluminum oxide, and 0 to at most 10 wt-% of "delta" modification of aluminum oxide; or
   aII) consists essentially of "theta" and "kappa" modifications of aluminum oxide, and 0 to at most 10 wt-% of "alpha" modification of aluminum oxide;
   b) has a pore diameter distribution with one maximum (monomodal pore distribution) or two maxima (bimodal pore distribution) in the range from 100 to 1,500 Å; and
   c) has a specific surface calculated according to the mercury porosimetry method of from 33 to 63 $m^2/g$.

2. A catalyst carrier according to claim 1, wherein the "gamma" and "kappa" modifications of aluminum oxide are present in a weight ratio of from 34:66 to 23:77.

3. A catalyst carrier according to claim 1, wherein said aluminum oxide consists essentially of "theta" and "kappa" modifications of aluminum oxide, and from 0 to at most 10 wt-% "alpha" modification of aluminum oxide.

4. A catalyst carrier according to claim 3, wherein the "theta" and "kappa" modifications of aluminum oxide are present in a theta:kappa weight ratio of from 30:70 to 10:90.

5. A catalyst carrier according to claim 1, wherein said aluminum oxide is in the form of essentially spherical particles.

6. A catalyst carrier according to claim 3, wherein said aluminum oxide is essentially free of "gamma" and "delta" modifications of aluminum oxide, contains 0 to at most 10 wt-% of "alpha" modification of aluminum oxide, has a pore diameter distribution with a single maximum (monomodal pore distribution) in the range from 700 to 1,500 Å or with two maxima (bimodal pore distribution) in the range from 100 to 1,500 Å, has a median pore diameter of from 300 to 500 Å, and has a specific surface calculated according to the mercury porosimetry method of from 41 to 50 $m^2/g$.

7. A carrier catalyst comprising a catalyst carrier according to claim 1, and at least one catalytically active metal or metal compound.

8. A fluidized bed catalytic reactor comprising a plurality of particles of a carrier catalyst according to claim 7, suspended in a fluid stream within a surrounding enclosure.

9. A process for producing a catalyst carrier consisting essentially of aluminum oxide ($Al_2O_3$) having a pore diameter distribution with a single maximum (monomodal pore distribution) or two maxima (bimodal pore distribution) in the range from 100 to 1,500 Å, and a specific surface calculated according to the mercury porosimetry method of from 33 to 63 $m^2/g$, said process comprising the steps of:

mixing amorphous "chi" modification aluminum oxide with aluminum oxide hydrate with the exception of β-aluminum oxide monohydrate, and with addition of water;

forming the resulting mixture of amorphous aluminum oxide and aluminum oxide hydrate into bodies having a desired shape; and calcining the formed bodies aI) at a temperature in the range from 700° C. and 1,020° C. in order to produce a catalyst carrier consisting essentially of "gamma" and "kappa" modifications of aluminum oxide, and from 0 to at most 10 wt-% "delta" modification of aluminum oxide; or aII) at a temperature in the range from 1,020° to 1,070° C. in order to produce a catalyst carrier consisting essentially of "theta" and "kappa" modifications of aluminum oxide, and from 0 to at most 10 wt-% of "alpha" modification of aluminum oxide.

10. A process according to claim 9, wherein said calcining takes place at a temperature in the range from 780° to 860° C., and a catalyst carrier is produced which consists essentially of "gamma" and "kappa" modifications of aluminum oxide, and from 0 to at most 10 wt-% "delta" modification of aluminum oxide.

11. A process according to claim 9, wherein in said forming step, the mixture is formed by build-up granulation into essentially spherical particles.

12. A process according to claim 11, wherein undersize particles or crushed oversize particles from a previous catalyst carrier production are added as nucleation agents to said build-up granulation.

13. A process according to claim 11, wherein said spherical particles have diameters in the range from 0.1 to 1.0 mm.

14. A process according to claim 9, wherein said calcining takes place for from 4.5 to 6.5 hours at a temperature of from 1,045° to 1,055° C., and a catalyst carrier is produced which consists essentially of aluminum oxide free of "gamma" and "delta" modifications, containing from 0 to at most 10 wt-% "alpha" modification of aluminum oxide, having a pore diameter distribution with a single maximum (monomodal pore distribution) in the range from 700 to 1,500 Å or with two maxima (bimodal pore distribution) in the range from 100 to 1,500 Å, having a median pore diameter of from 300 to 500 Å, and having a specific surface calculated according to the mercury porosimetry method of from 41 to 50 $m^2/g$.

* * * * *